US010357736B2

(12) United States Patent
Prather et al.

(10) Patent No.: US 10,357,736 B2
(45) Date of Patent: *Jul. 23, 2019

(54) DOWNDRAFT TABLE WITH SELF-CLOSING LOUVRE

(71) Applicant: DualDraw, a Limited Liability Company, Denver, CO (US)

(72) Inventors: Daniel Brian Prather, Denver, CO (US); Javion Blake, Denver, CO (US)

(73) Assignee: DualDraw, a Limited Liability Company, Denver, CO (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/345,287

(22) Filed: Nov. 7, 2016

(65) Prior Publication Data

US 2017/0128872 A1    May 11, 2017

Related U.S. Application Data

(60) Provisional application No. 62/252,290, filed on Nov. 6, 2015.

(51) Int. Cl.
| | | |
|---|---|---|
| *B01D 46/00* | (2006.01) | |
| *B01D 50/00* | (2006.01) | |
| *B01D 46/18* | (2006.01) | |
| *B01D 51/00* | (2006.01) | |
| *B01D 46/42* | (2006.01) | |

(Continued)

(52) U.S. Cl.
CPC ......... *B01D 46/48* (2013.01); *B01D 46/0006* (2013.01); *B01D 46/0045* (2013.01); *B01D 46/0068* (2013.01); *B01D 46/0089* (2013.01); *B01D 46/2411* (2013.01); *B01D 46/446* (2013.01); *B01D 2265/025* (2013.01)

(58) Field of Classification Search
CPC ........ B01D 46/00; B01D 50/00; B01D 46/18; B01D 51/00; B01D 46/42; B23K 9/32
USPC ...... 55/385.1, 484, 493, 502, 506, 302, 293, 55/354, 317, 430, 320, 323; 95/273, 280
See application file for complete search history.

(56) References Cited

U.S. PATENT DOCUMENTS 5,746,796 A * 5/1998 Ambs ................ B01D 46/0005
                                                          55/480
5,807,414 A    9/1998 Schaefer
(Continued)

OTHER PUBLICATIONS

Diversitech Operation and Maintenance Manual for Industrial Downdraft Tables. OMM-DD-Industrial-Series-104 [E N].

(Continued)

*Primary Examiner* — Amber R Orlando
*Assistant Examiner* — Minh Chau T Pham
(74) *Attorney, Agent, or Firm* — Holzer Patel Drennan

(57) ABSTRACT

Implementations disclosed herein provide a compact downdraft table system including a vertically oriented cylindrical filter cartridge located below a work surface in a main housing of the downdraft table, a purge assembly in the main housing vertically aligned with the filter cartridge that discharges purged air to an interior of the filter cartridge to purge particulates collected on an exterior of the filter cartridge, and a self-closing louvre in the main housing that permits air flow from the work surface, through the louvre, and through the filter assembly in a first direction, and prevents purged air flow from flowing through the louvre to the work surface in a second direction opposite the first direction.

20 Claims, 10 Drawing Sheets

(51) Int. Cl.
*B23K 9/32* (2006.01)
*B01D 46/48* (2006.01)
*B01D 46/24* (2006.01)
*B01D 46/44* (2006.01)

(56) References Cited

U.S. PATENT DOCUMENTS

| | | | | |
|---|---|---|---|---|
| 6,290,740 | B1 | 9/2001 | Schaefer | |
| 6,451,091 | B1 * | 9/2002 | Avina | B01D 46/44 55/341.1 |
| 6,616,720 | B1 * | 9/2003 | Smith | B08B 15/002 454/187 |
| 6,783,563 | B1 * | 8/2004 | Eckhoff | B01D 46/02 55/356 |
| 7,040,239 | B2 * | 5/2006 | Shelton | B01D 46/02 108/161 |
| 9,844,306 | B1 * | 12/2017 | Fitzpatrick | B08B 15/00 |
| 2002/0020160 | A1 * | 2/2002 | Moore | B01D 46/0005 55/484 |
| 2003/0089087 | A1 * | 5/2003 | Reid | B01D 46/0005 55/385.1 |
| 2009/0113857 | A1 * | 5/2009 | Sithes | B01D 46/0068 55/293 |
| 2015/0017898 | A1 * | 1/2015 | Agosti | B23Q 7/02 454/61 |
| 2016/0193635 | A1 * | 7/2016 | Mate | B23K 37/0461 454/63 |
| 2017/0095892 | A1 * | 4/2017 | Reid | B23K 37/006 |

OTHER PUBLICATIONS

Avani Environmental SDT-3/SDT-5 Table advertisement.
Farr Gold Series Industrial Dust Collector—Camfil APC; located at http://www.farapc.com/products/high-vacuum/, as retrieved on Nov. 5, 2015, 6 Pgs.
Pentair Goyen 'Blowtube Nozzles and Cartridge Cleaning Cones' Rev03 Nov. 2014; located at http://cleanairsystems.com/images/site-images/literature/Filter_Cleaning_System_Accessories/Goyen-Blowtube-Nozzles-Rev02-112014.pdf; as retrieved on Jan. 3, 2017, 12 Pgs.

* cited by examiner

DOWNDRAFT TABLE WITH SELF-CLOSING LOUVRE

CROSS-REFERENCE TO RELATED APPLICATIONS

The present application claims priority to U.S. Provisional Patent Application Ser. No. 62/252,290, entitled "Downdraft Table System," filed on Nov. 6, 2015, of which is specifically incorporated by reference for all that it discloses and teaches.

BACKGROUND

Exposure to poor air in industrial facilities can affect the health and safety of employees. Downdraft tables are used to collect dust, fumes, smoke, and particulates during certain industrial operations and applications. Downdraft tables can provide air filtration and maintain the air quality and control in a work environment.

SUMMARY

Implementations disclosed herein provide a compact downdraft table system comprising a vertically oriented cylindrical filter cartridge located below a work surface in a main housing of the downdraft table, a purge assembly in the main housing vertically aligned with the filter cartridge that discharges purged air to an interior of the filter cartridge to purge particulates collected on an exterior of the filter cartridge, and a self-closing louvre in the main housing that permits air flow from the work surface, through the louvre, and through the filter assembly in a first direction, and prevents purged air flow from flowing through the louvre to the work surface in a second direction opposite the first direction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

BRIEF DESCRIPTIONS OF THE DRAWINGS

DETAILED DESCRIPTION

The disclosed technology includes a downdraft table for industrial applications that require air filtration. Specifically, the downdraft table may include a compact, easy to maintain downdraft table for use in facilities with limited floor space that may include at least one vertically aligned filter cartridge and a fan located beneath the work surface. In some implementations, the downdraft table includes a clamp assembly configured to lock the vertically aligned filter cartridge in place. In some implementations, the downdraft table includes a spark arrestor for fire protection. In some implementations, the downdraft table includes a louvre configured for one-way airflow, and an integrated purge assembly configured to purge particulates. The purge operation is performed via a cartridge cleaning cone, and can be performed manually or automatically. All of the aforementioned components may be located in a main housing of the downdraft table.

Figure 1:
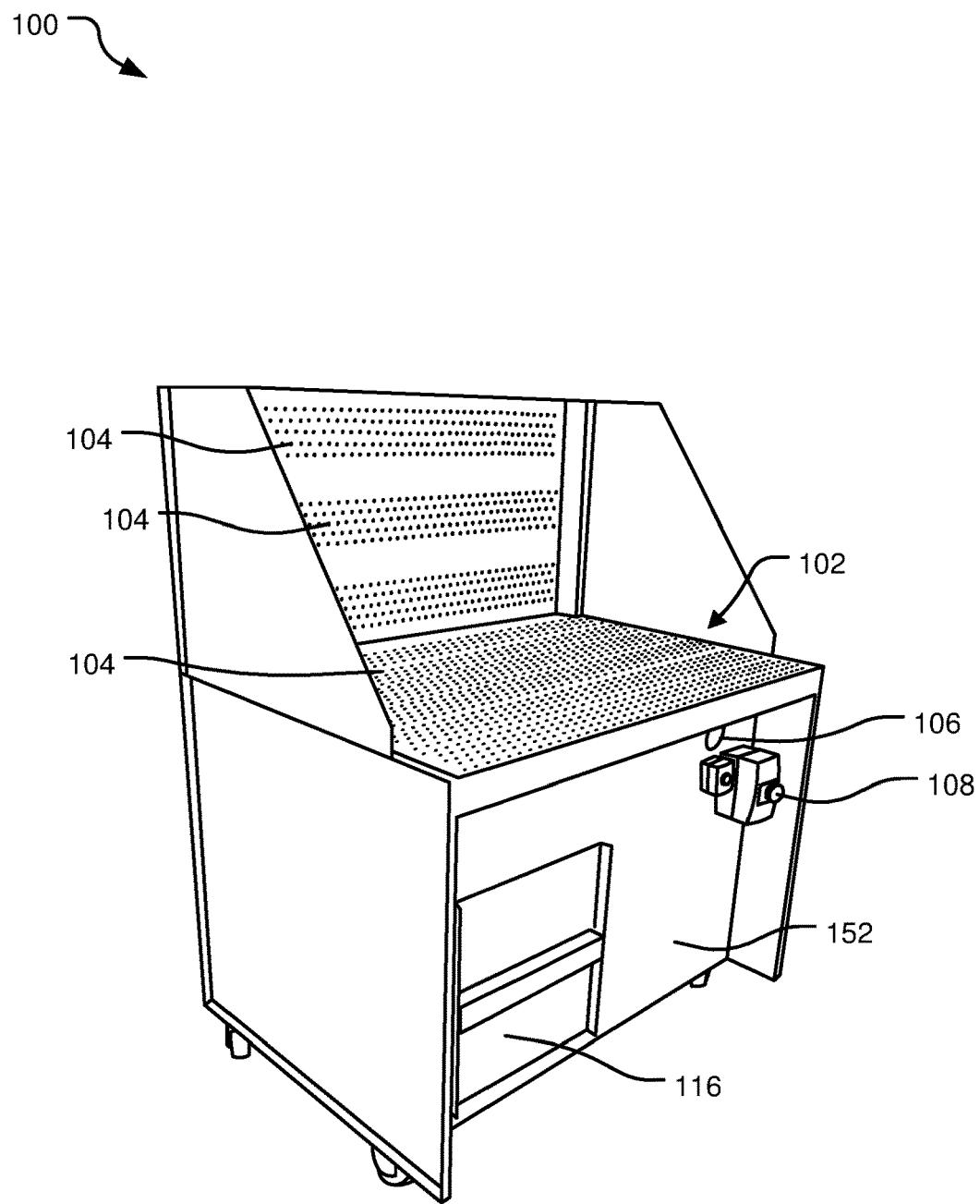
FIG. 1 illustrates a perspective exterior view of an example downdraft table.

FIG. 1 illustrates a perspective exterior view of an example downdraft table. The downdraft table 100 in FIG. 1 is a compact system that can be used in industrial applications. In some implementations, the downdraft table 100 can be moved and is positioned on caster wheels. In other implementations, the disclosed technology may be included in an air filtration system.

Referring to FIG. 1, air can be pulled through perforated holes 104 in a work surface 102 of the downdraft table 100. In some implementations, the work surface 102 can be more than one surface, as shown in FIG. 1, which includes both a vertical surface and a horizontal surface. Thus, air in FIG. 1 can be pulled downward and horizontally through the perforated holes 104 into the downdraft table by a fan, which is located below the work surface 102. In other implementations, the work surface 102 is one surface, for example, a horizontal surface. In other implementations, for example in an air filtration system, air can be pulled through an intake, panel, nozzle, or other entry way.

In FIG. 1, the downdraft table 100 has downdraft airflow via the perforations or perforated holes 104 in the downdraft table 100. In some implementations, the downdraft table 100 has both downdraft and backdraft airflow, via the perforations or perforated holes 104 in the table. The perforations in the walls of the downdraft table 100 can vary in size. For example, the perforations can be ½"× ³⁄₁₆", ½"× ⅜", and ½"× ½". The perforations may be configured into grates. For example, the perforations may be configured into removable grates (e.g., 5" wide, 1" thick grates which span the length of the work surface (e.g., 36", 48", 60", 72", etc. long)). Other work surface configurations are contemplated. The vacuum of the fan in the downdraft table 100 provides even dispersion of airflow over the work surface 102 of the downdraft table 100.

In FIG. 1, various controls (e.g., an on/off switch 108, a pressure gauge 106, etc.) are located on a front panel 152 of the downdraft table 100. In other implementations, various controls can be located in different areas of the downdraft table 100. The on/off switch 108 for a motor and blower control pulls air from the work surface 102 down into the downdraft table 100 and out through an exhaust (not shown) in the back of the downdraft table 100. In some implementations, the control may be a manual toggle switch that acts as motor starter. The control may be housed in a NEMA 12/4X enclosure and contains thermal protection that protects the operator from electrical issues.

As vacuum builds up in the downdraft table 100, a pressure gauge 106, also located on the front panel 152 of the downdraft table 100 measuring the air pressure, indicates to the operator when the vacuum meets a predetermined differential pressure threshold. In some implementations, the predetermined differential pressure threshold can be a static reading. The pressure gauge 106 provides the operator with an indication of the cleanliness of the filters. Through this feedback, the operator will make a determination based on the setting of the pressure gauge 106 of when to purge the filter cartridge (not shown) of particulate. In some implementations, the controls include a button for an integrated purge assembly configured to purge particulates from the filter cartridge (described in detail below).

Figure 2:
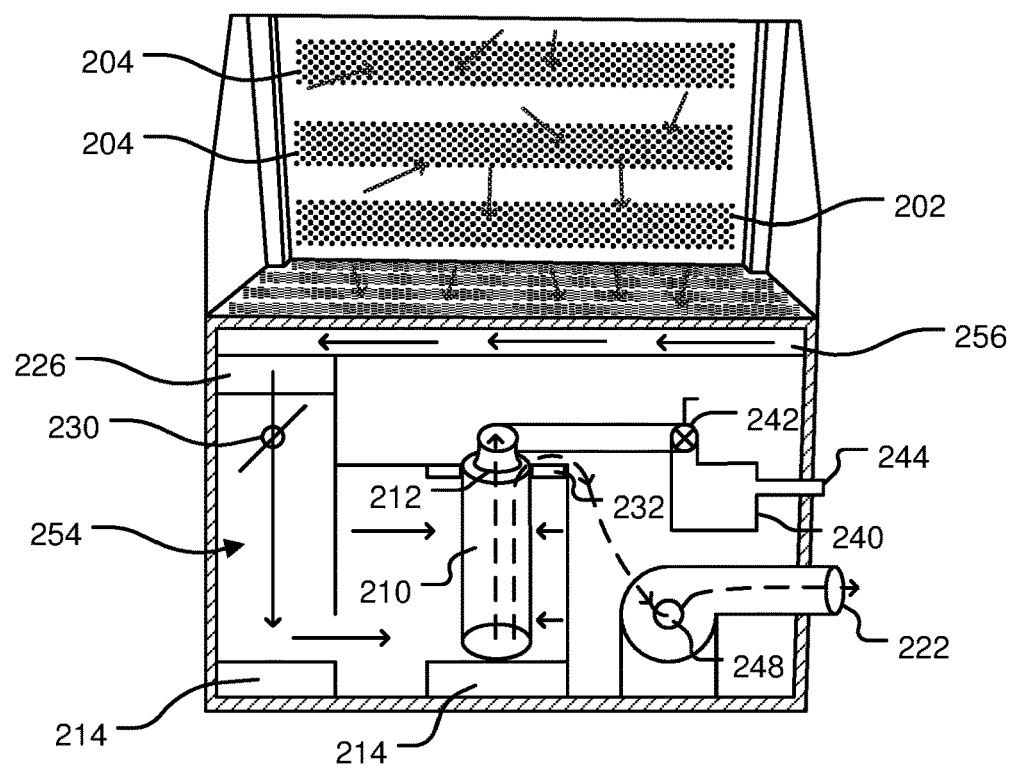
FIG. 2 illustrates airflow in a sectional interior view of an example downdraft table during air filtration operations.

As air, including particulates in the air, is pulled from the exterior of the downdraft table 100, it moves towards the left interior side of the downdraft table 100 (airflow is shown in FIG. 2). In other implementations, airflow can be moved in another direction (e.g., right, front, or back).

In some implementations, the air moves through a spark arrestor (not shown) located under the work surface 102 in between the filter cartridge and the work surface 102. The spark arrestor adds protection against applications that may create sparks or increased risk of a fire such as welding, grinding metal, or plasma cutting. The air moves through the spark arrestor downward in the downdraft table 100, and then moves in a direction toward the center of the downdraft table 100 into a compartment (not shown) which houses at least one vertically aligned filter cartridge. The filter cartridge may be hollow. As the air moves into the filter cartridge, particulates in the air attach to the exterior of the filter cartridge.

Vertical alignment of a filter cartridge provides easy particulate shedding in the disclosed configuration using gravity to its advantage. A horizontally aligned filter in a downdraft table 100 can present cleaning challenges because much of the particulate on the top of the filter will "re-entrain" or settle back onto the filter surface, leaving much of the filter uncleaned and in need of a filter change more frequently.

In some implementations, particulate is precluded from blow-back towards the operator by a one-way self-closing louvre (not shown) that allows dirty air to move through the downdraft table 100 in only one direction, thus protecting the operator from potential particulate following a filter purge operation.

In some implementations, an exhaust port (not shown) is located in the back of the downdraft table 100, and the air exits out a back wall of the downdraft table 100. In other implementations, the exhaust may be vented out a different wall of the downdraft table 100 (e.g., a bottom wall).

The configuration of the filter cartridge in the downdraft table 100 is designed to address applications that produce large amounts of dust or fumes on a continuous basis. An operator can observe the pressure gauge 106 mounted on the unit facing the operator to help determine the cleanliness of the filters. The pressure gauge 106 measures the differential pressure, or pressure of clean air and dirty air, across the filter cartridge.

When a filter cartridge has met a predetermined differential pressure threshold and/or needs to be cleaned, a notification system can send a signal to an integrated purge assembly, or alert the operator. The threshold can be a specific pressure range indicating particulates have accumulated on the filter and airflow is no longer constant. Upon determining the threshold is met, a filter purge operation can occur.

In some implementations, the integrated purge assembly automatically blows compressed air through a cartridge cleaning cone or gasket (not shown) into the filter cartridge in a uniform manner that dislodges particulate from the surface of the filter cartridge and deposits the particulate into removable clean-out drawers located below the filter cartridge. In other implementations, once the air pressure meets the predetermined differential pressure threshold, an operator can push a control button 108 to activate an integrated purge assembly.

In FIG. 1, a door 116 is shown on the front of the downdraft table 100, which provide access to the filter cartridge and a tray on the left side underneath the work surface 102. The downdraft table 100 may have additional doors. For example, a door may be located on the side of the downdraft table 100 for access to the interior of the downdraft table 100 for maintenance, etc. (access to motor, blower, etc.).

In some implementations, the downdraft table 100 may have more than one tray. For example, a first tray may be located under the spark arrestor and a one-way valve in a chute in the main housing, and a second tray may be located below the filter in the main housing to collect particulates. Removal of the clean-out drawers does not require removal of the filter or any other disassembly of the unit.

The filter cartridge 110 is removable by hand once ready for replacement. In the disclosed technology, the filter cartridge in the downdraft table 100 is held in place by a locking system that uses pressure to seal and secure the filter cartridge with a locking mechanism. In some implementations, the locking system includes a cam lock assembly. The cam lock assembly functions by transforming rotational motion applied to a lever by an operator into a translational motion which raises and compresses the filter gasket to create a desired seal. A filter is removable by hand once ready for replacement. Changing filters requires no tools and filter access requires only the straightforward removal of the filter door located on the front lower face of the unit.

The downdraft table 100 can have a power source, an air inlet and gauge for an air compressor source, and perforations (or expanded metal) on the back side of the downdraft table 100 for ventilation of the air moving out of the downdraft table (exhaust) (not shown). The downdraft table 100 can be configured for single phase (115V/230V) or three phase (208-230V/460V) power. Exhaust ports can be located on the rear side or on the bottom of the downdraft table 100. The downdraft table 100 may also have a connection for compressed air.

The downdraft table can be a modular design, and can be tailored to desired applications and sizes, as well as user requirements. For example, the following downdraft tables with vented back stops can be configured:
1. Approximately 2000 CFM, 35"D×48"W×58"H
2. Approximately 2500 CFM, 35"D×60"W×58"H
3. Approximately 3000 CFM, 35"D×72"W×58"H
4. Approximately 4000 CFM, 35"D×96"W×58"H
5. Approximately 2000 CFM, 35"D×48"W×80"H
6. Approximately 2500 CFM, 35"D×48"W×80"H
7. Approximately 3000 CFM, 35"D×48"W×80"H
8. Approximately 4000 CFM, 35"D×48"W×80"H The following flat top downdraft tables can be configured:
1. Approximately 2000 CFM, 35"D×48"W×34"H, Flat Top Downdraft Table 2. Approximately 2500 CFM, 35"D×48"W×34"H, Flat Top Downdraft Table
3. Approximately 3000 CFM, 35"D×48"W×34"H, Flat Top Downdraft Table
4. Approximately 4000 CFM, 35"D×48"W×34"H, Flat Top Downdraft Table By way of example, depth of the downdraft tables can be increased in increments of 5" (e.g., up to 60," 40," 45," 50," 55," and 60"). In other implementations, various configurations and sizes of the downdraft table are contemplated.

FIG. 2 illustrates airflow in a sectional interior view of an example downdraft table 200 during air filtration operations. Air including particulates or "dirty air" is shown moving from a work surface 202 into the interior of the downdraft table 200 in a solid line with arrows. Filtered air or "clean air" is shown moving out of a hollow filter cartridge 210, towards a fan 248, and out an exhaust port 222 in a dotted line with arrows. The movement of the airflow is described in detail below.

Specifically, dirty air can be pulled through perforated holes 204 in the work surface 202 of the downdraft table 200. The work surface 202 includes both a vertical surface and a horizontal surface. Thus, dirty air in FIG. 2 can be pulled downward and horizontally through the perforated holes 204 into the downdraft table 200 by a fan 248, which is located below the work surface 202. The fan 248 may have a motor. In some implementations, static vacuum of the fan 248 in the downdraft table 200 provides even dispersion of airflow over the work surface 202 of the downdraft table 200.

As dirty air, including particulates in the air, is pulled from the exterior of the downdraft table 200 through the work surface 202 it moves towards the left side of the interior of the downdraft table 200. In other implementations, airflow can be moved in another direction (e.g., right, front, or back). As shown in FIG. 2, the dirty air moves in a left direction in a top compartment 256 (e.g., plenum 256) and then downward in a vertical chute 254. In other implementations, there may be other configurations of compartments, chutes, and pathways.

In FIG. 2, dirty air moves through a spark arrestor 226 located under the work surface 202 in between the filter cartridge 210 and the work surface 202 in the vertical chute 254. The spark arrestor 226 adds protection against applications that may create sparks or increased risk of a fire such as welding, grinding metal, or plasma cutting.

In some implementations, particulate is precluded from blow-back towards the operator by a one-way self-closing louvre 230 that allows dirty air to move through the downdraft table 200 in only one direction, thus protecting the operator from potential particulate following a filter purge operation. In FIG. 2, the one-way self-closing louvre 230 is located in the vertical chute 254 in the main housing of the downdraft table 200.

In FIG. 2, the air moves through the spark arrestor 226 and one-way self-closing louvre 230 downward in the downdraft table 200, and then moves in a direction toward the center of the downdraft table 200 into a compartment which houses at least one vertically aligned filter cartridge 210 in the main housing of the downdraft table 200. As air moves into the filter cartridge 210, particulates in the air attach to the filter cartridge 210. Once the dirty air permeates the filter and deposits particulate, "clean" air is drawn up around cones 212 and back down to an inlet to the fan 248.

Vertical alignment of a filter cartridge 210 provides easy particulate shedding in the disclosed configuration using gravity to its advantage. A horizontally aligned filter in downdraft tables can present cleaning challenges because much of the particulate on the top of the filter will "re-entrain" or settle back onto the filter surface, leaving much of the filter uncleaned and in need of a filter change more frequently.

An exhaust port 222 is located in the back of the downdraft table 200, and air exits from the filter cartridge 210 out a back wall of the downdraft table 200. In other implementations, the exhaust port 222 may be vented out a different wall of the downdraft table 100 (e.g., a bottom wall).

The configuration of the filter cartridge 210 in the downdraft table 200 is designed to address applications that produce large amounts of dust or fumes on a continuous basis. An operator can observe the pressure gauge (not shown) mounted on the downdraft table 200 facing the operator to help determine the cleanliness of the filters. The pressure gauge measures the differential pressure, or pressure of clean air and dirty air, across the filter cartridge 210.

When the filter cartridge 210 has met a predetermined differential pressure threshold and/or needs to be cleaned, a notification system can send a signal to an integrated purge assembly, or alert the operator. The threshold can be a specific pressure range indicating particulates have accumulated on the filter and airflow is no longer constant. Upon determining the threshold is met, a filter purge operation can occur.

In some implementations, the integrated purge assembly includes a holding tank 240 in the main housing configured to hold compressed air from a compressed air fitting 244 The integrated purge assembly can automatically open a solenoid 242 and purge compressed air from the holding tank 240 through the solenoid 242 and through a cartridge cleaning cone or gasket 212 into the filter cartridge 210 in a uniform manner that dislodges particulate from the surface of the filter cartridge 210. As a result, particulate is dislodged into removable clean-out drawers 214 located below the filter cartridge 210.

In other implementations, once the air pressure meets the predetermined differential pressure threshold, an operator can push a control button 208 to activate an integrated purge assembly. The airflow of the disclosed purge operations is shown and described in FIG. 3.

In some implementations, the downdraft table 100 may have more than one tray. For example, a first tray may be located under the spark arrestor and a one-way valve in a chute in the main housing, and a second tray may be located below the filter in the main housing to collect particulates. Removal of the clean-out drawers does not require removal of the filter or any other disassembly of the unit.

The filter cartridge 210 is also removable. In the disclosed technology, the filter cartridge 210 in the downdraft table 200 is held in place by a clamping assembly 232 that uses pressure to seal and secure the filter cartridge 210 with a locking mechanism. The clamping assembly is shown and described in more detail in FIGS. 6 and 7.

Figure 3:
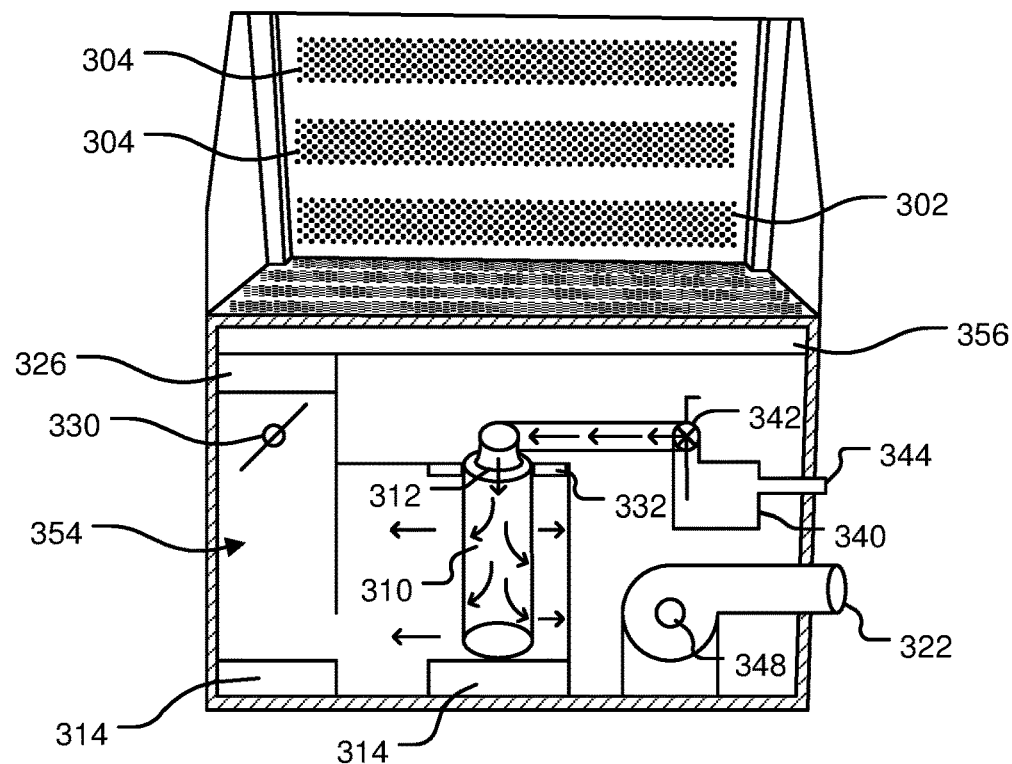
FIG. 3 illustrates airflow in a sectional interior view of an example downdraft table during purge operations.

FIG. 3 illustrates airflow in a sectional interior view of an example downdraft table during purge operations. As air is pulled through perforated holes 304 in a work surface 302 of the downdraft table 300, as shown and described in FIG. 2, air builds up in the downdraft table 300. A pressure gauge (not shown) in the downdraft table 300 measures the differential pressure, and indicates to the operator or to an automated system when the air pressure meets a predetermined differential pressure threshold. In some implementations, the predetermined differential pressure threshold can be a static reading.

An operator can observe the pressure gauge (not shown) mounted on the unit facing the operator to help determine the cleanliness of the filters. The pressure gauge 306 measures the differential pressure, or pressure of clean air and dirty air, across the filter cartridge 310. Through this feedback, the operator will make a determination based on the setting of the pressure gauge of when to purge the filter cartridge 310 of particulates. In some implementations, the controls include a button for an integrated purge assembly configured to purge particulates from the filter cartridge 310.

When a filter cartridge 310 has met a predetermined differential pressure threshold and/or needs to be cleaned, a notification system can send a signal to an integrated purge assembly, or alert the operator. The threshold can be a specific pressure range indicating particulates have accumulated on the filter and airflow is diminished. Upon determining the threshold is met, a filter purge operation can occur.

In some implementations, the integrated purge assembly includes a holding tank 340 in the main housing configured to hold compressed air from a compressed air fitting 344. The integrated purge assembly can automatically open a solenoid 342 and purge compressed air from the holding tank 340 through the solenoid 342 and through a cartridge cleaning cone or gasket 312 into the filter cartridge 310 in a uniform manner that dislodges particulate from the surface of the filter cartridge 310. As a result, particulate is dislodged into removable clean-out drawers 314 located below the filter cartridge 310.

In some implementations, the downdraft table 300 may have more than one tray. For example, a first tray may be located under the spark arrestor 326 and a one-way valve 330 in a chute in the main housing, and a second tray 314 may be located below the filter cartridge 310 in the main housing to collect particulates.

Particulate is precluded from blow-back towards the operator by a one-way self-closing louvre 330 that allows dirty air to move through the downdraft table 300 in only one direction, thus protecting the operator from potential particulate following a filter purge operation.

The filter cartridge 310 is removable by hand. In the disclosed technology, the filter cartridge 310 in the downdraft table 300 is held in place by a clamping assembly 332 that uses pressure to seal and secure the filter cartridge 310 with a locking mechanism.

Figure 4:
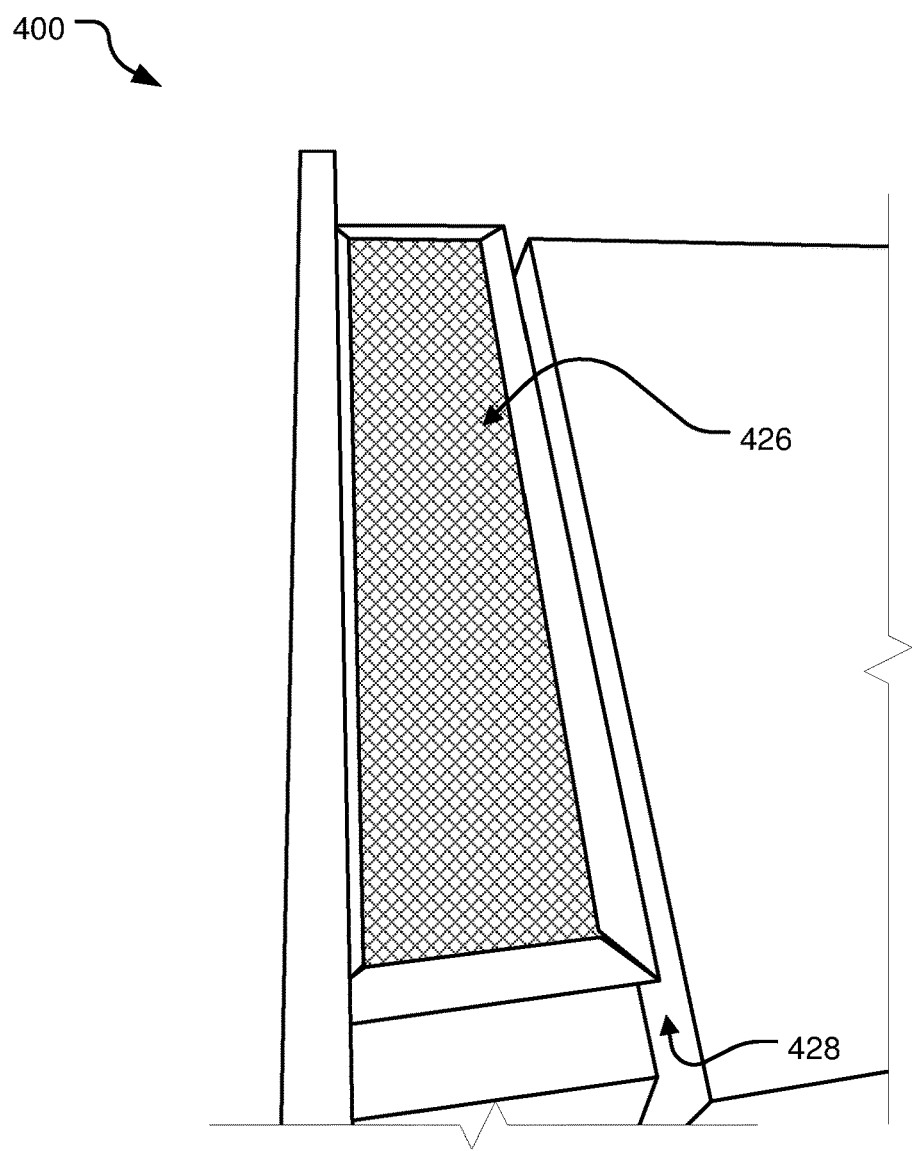
FIG. 4 illustrates a top perspective view of an example downdraft table, including a spark arrestor.

FIG. 4 illustrates a top perspective view of an example downdraft table 400, including a spark arrestor 426. The spark arrestor 426 may be inserted in between the work surface (not shown) and the filter cartridge (not shown) for added protection against applications that may create sparks or increased risk of a fire such as welding, grinding metal, or plasma cutting. The spark arrestor 426, which may contain expanded metal mesh, which prevents sparks from contacting either the filter cartridge or filter housing. Adjacent to the spark arrestor 426 is a wall 428 that encases the components underneath the wall and is sealed so that air coming into the work surface does not enter the compartments under the wall 428, but is directed toward the spark arrestor 426.

Figure 5A:
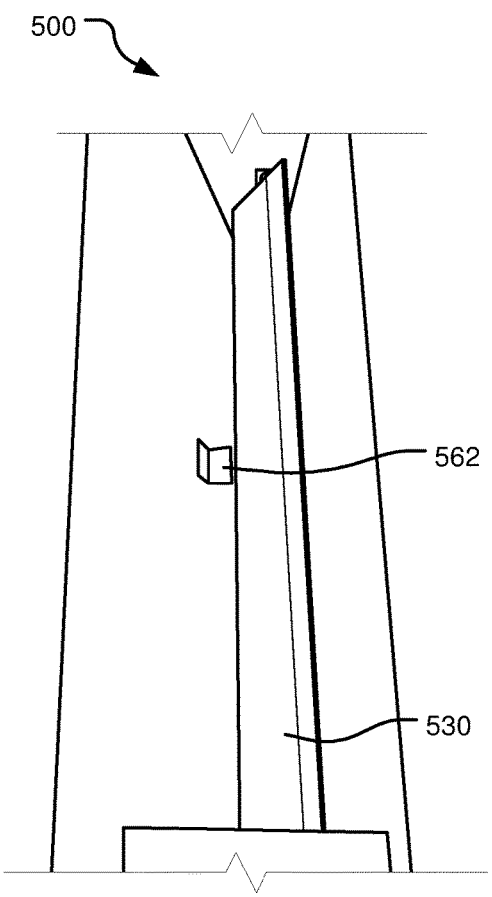
FIGS. 5A and 5B illustrates a top perspective view of an example downdraft table, including one-way louvre.
Figure 5B:
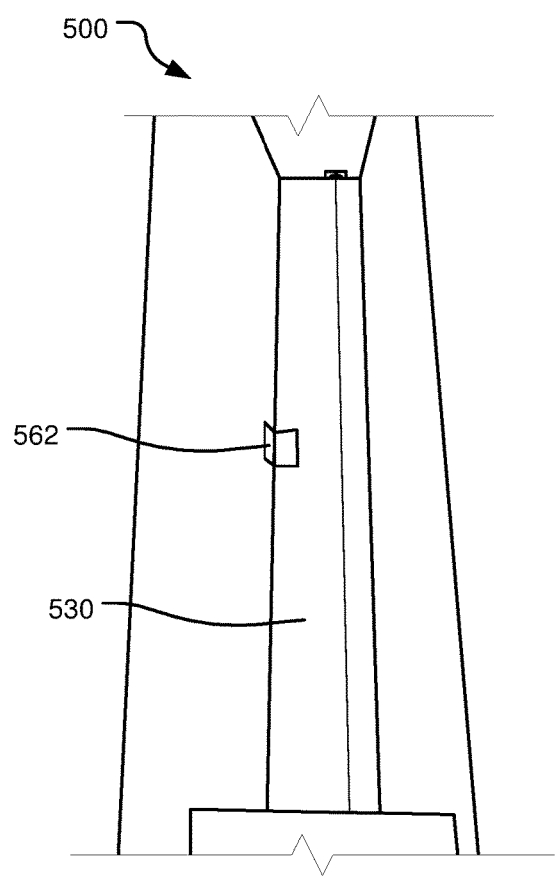

FIGS. 5A and 5B illustrate top perspective views of an example downdraft table 500, including a one-way louvre 530. FIG. 5A illustrates a top view of an open louvre 530. FIG. 5B illustrates a top view of a closed louvre 530.

The louvre 530 in FIGS. 5A and 5B is located below the work surface (not shown) of the example downdraft table 500 and in between the work surface and the filter cartridge (not shown).

Referring to FIG. 5A, the work surface has been removed to show the louvre 530 in the open position. Air must pass through the work surface first before entering the open louvre 530. The louvre 530 allows dirty air to move through the downdraft table 500 in only one direction, thus protecting the operator from potential particulate following a filter purge operation. Specifically, the louvre 530 opens as dirty air is drawn through the downdraft table.

FIG. 5B illustrates a top view of a closed louvre 530. The louvre 530 provides a one-way self-closing louvre to preclude particulate from blow-back towards the operator. During air filtration and purge operations, the louvre 530 closes to avoid blowback and protects the operator from potential particulate following a filter purge session. A stop 562 prevents the louvre from opening in a second direction and maintains airflow in a first direction.

Figure 6:
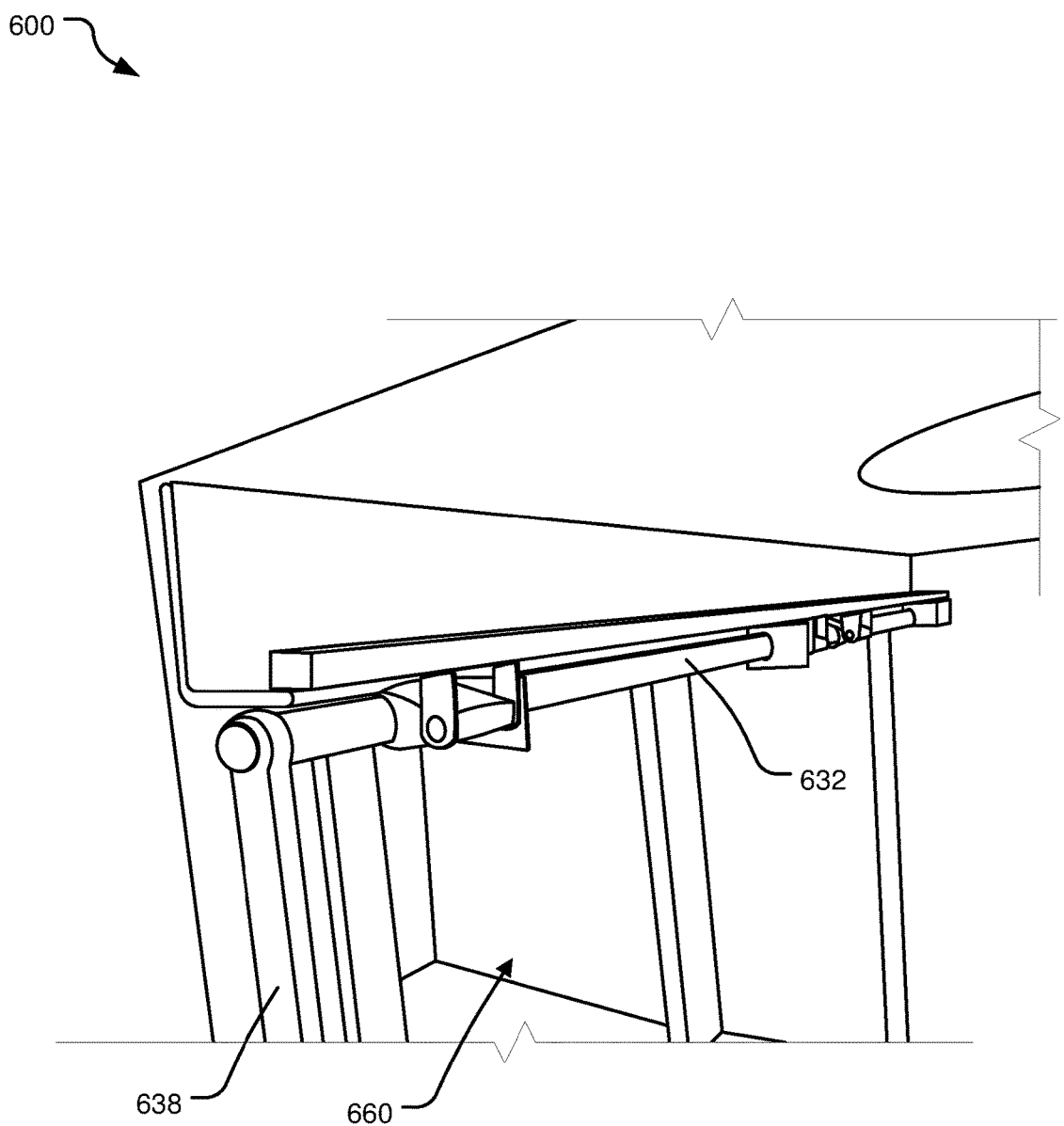
FIG. 6 illustrates a side perspective elevation view of an example downdraft table, including a clamping assembly.

FIG. 6 illustrates a side perspective elevation view of a clamping assembly 632 one side of a filter compartment 660 in an example downdraft table 600. The clamping assembly 632 is configured to lock a vertically aligned filter cartridge (not shown) in place. The filter cartridge in the downdraft table 600 is held in place by a mechanism that uses pressure to seal and secure the filter cartridges with a locking mechanism. As shown, the clamping assembly 632 includes a cam lock assembly. The cam lock assembly functions by transforming rotational motion applied to a levers (e.g., lever 638, only one lever 638 is shown in FIG. 6) by the operator into a translational motion which raises and compresses a filter gasket to create a desired seal. A filter pusher bar places the pressure on the filter flange and acts as the mating surface from the clamp assembly to the filter.

To unlock the filter cartridge, an operator can rotate the levers 638 down on each side of the filter compartment 660. The filter is removable by hand. Changing filters requires no tools and filter access requires only the straightforward removal of the filter door located on the front lower face of the unit.

Figure 7:
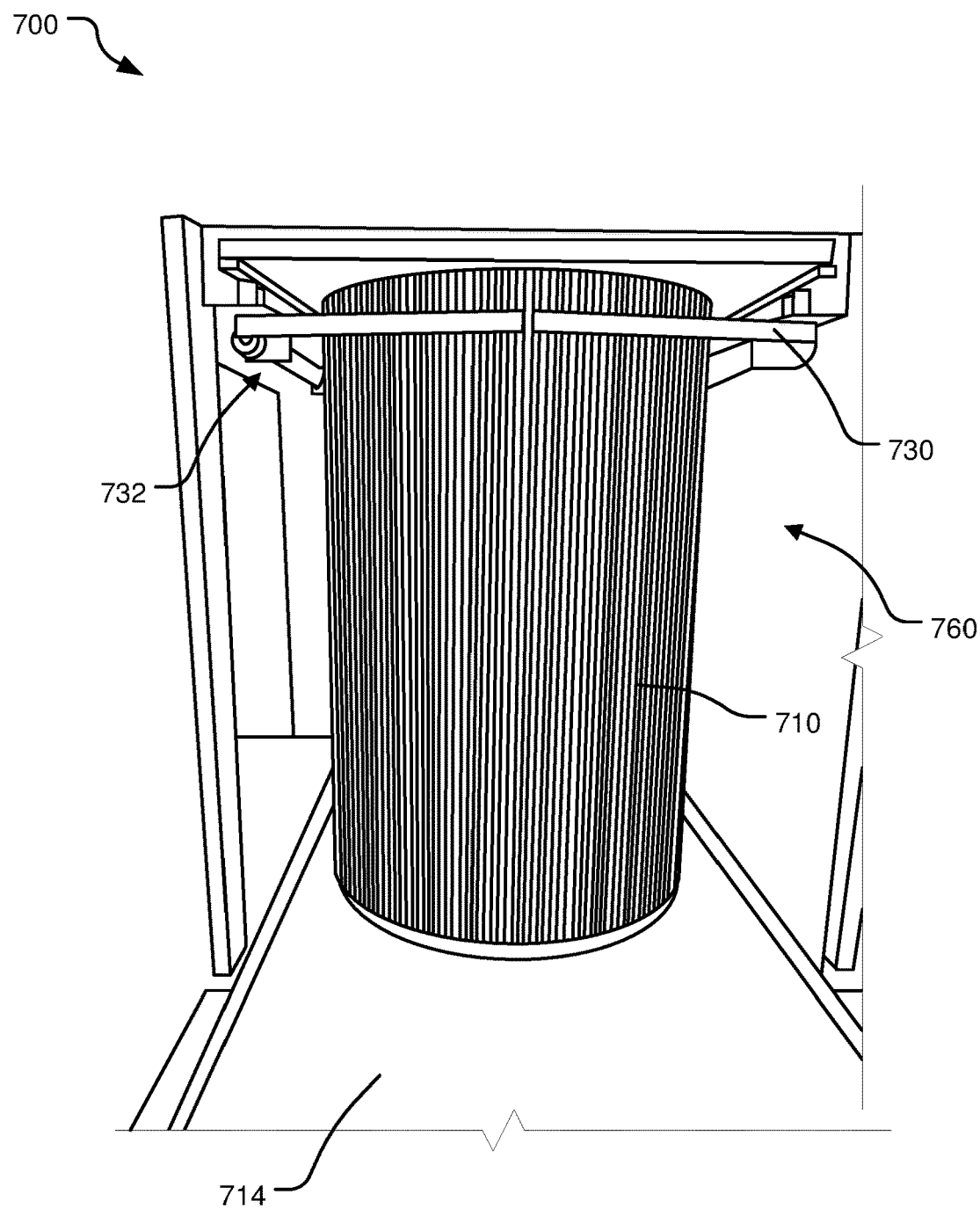
FIG. 7 illustrates a side elevation view of an example downdraft table, including a locked filter cartridge.

FIG. 7 illustrates a side elevation view of a locked filter cartridge 710 in a filter compartment 760 in an example downdraft table 700. The clamping assembly 732 is configured to lock a vertically aligned filter cartridge 710 in place. The filter cartridge 710 in the downdraft table 700 is held in place by a mechanism that uses pressure to seal and secure the filter cartridges with a locking mechanism. The clamping assembly 732 includes a cam lock assembly. The cam lock assembly functions by transforming rotational motion applied to levers (e.g., lever 738) by the operator into a translational motion which raises and compresses a filter gasket (not shown) to create a desired seal. A filter pusher bar (not shown) places the pressure on the filter flange and acts as the mating surface from the clamp assembly 732 to the filter cartridge 710.

To unlock the filter cartridge 710, an operator can rotate the levers 738 down. The filter cartridge 710 is removable by hand. Changing filters requires no tools and filter access requires only the straightforward removal of the filter door located on the front lower face of the unit. A clean-out drawer 714 located below the filter that collects particulate may also be removed and cleaned.

Figure 8:
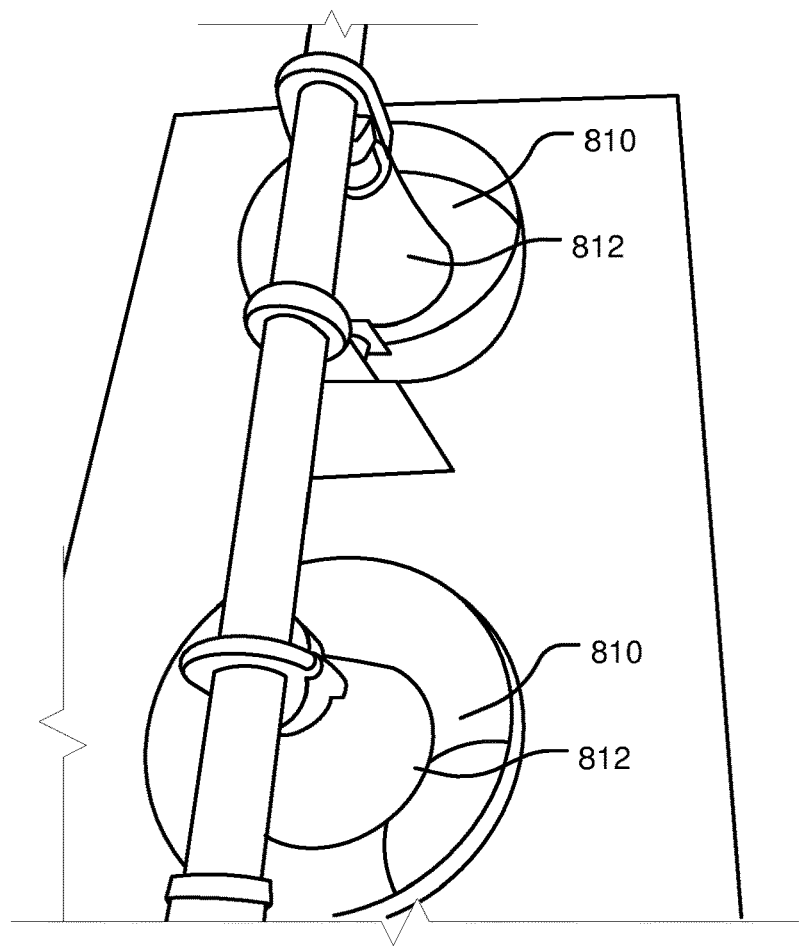
FIG. 8 illustrates a top perspective view of an example downdraft table, including an example purge assembly.

FIG. 8 illustrates top perspective view of an example purge assembly in an example downdraft table 800. The work surface and a sealed wall have been removed to show the components located inside the downdraft table, including vertically aligned filter cartridges 810, and an integrated purge assembly configured to purge particulates from the filter cartridges 810. In some implementations, the purge operation is performed via a cartridge cleaning cone (e.g., two cartridge cleaning cones 836 are shown in FIG. 8), and can be performed manually or automatically. In FIG. 8, two cartridge cleaning cones 812 are located above the filter cartridges 810. In other implementations, other configurations may include a different number of filter cartridges and cones.

The plumbing for a pressure gauge may include clear tubing. Plumbing for a holding tank includes a hard conduit that connects to a solenoid. The holding tank (not shown) on the right side of the downdraft table fills with compressed air from an outside source. The holding tank may be under constant pressure. An operator pushes a purge button or control, which activates and opens a solenoid. Airflow moves from the holding tank through the solenoid to disperse an airstream through a cone into the center of the filter cartridge, thereby cleaning out the filter cartridge.

Compressed air blows through the filter cartridge 810 in a uniform manner that dislodges particulate from the surface of the filter cartridge 810 and deposits the particulate into at least one easily removed clean-out drawer (not shown) located below the filter. The purge operation can be performed manually or automatically.

Figure 9:
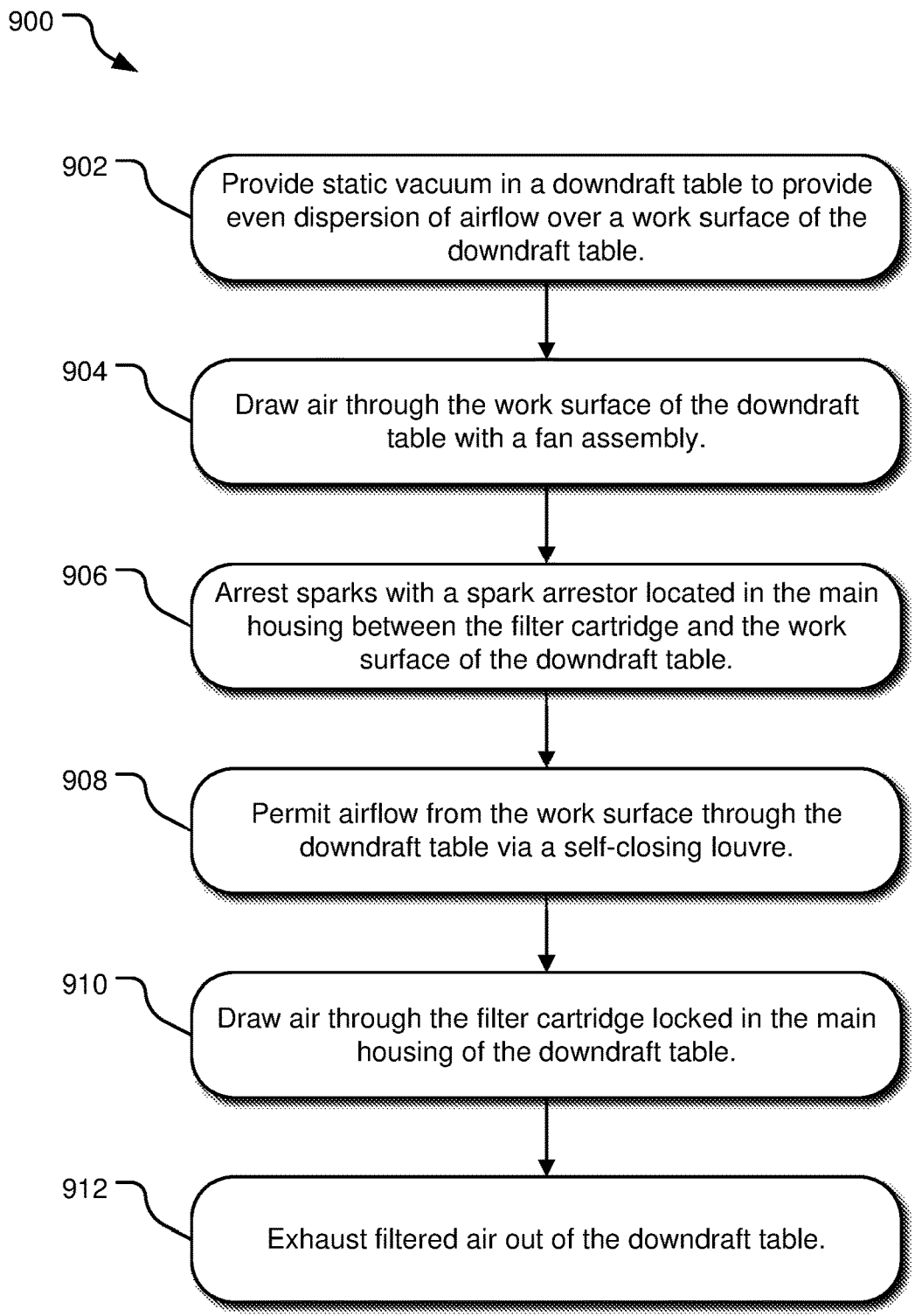
FIG. 9 illustrates a flowchart of example air filtration operations in an example downdraft table.

FIG. 9 illustrates example air filtration operations 900 in an example downdraft table. An operation 902 provides static vacuum in a downdraft table to provide even dispersion of airflow over a work surface of the downdraft table.

An operation 904 draws air through the work surface of the downdraft table with a fan assembly. Specifically, air can be pulled through perforated holes in the work surface of the downdraft table. In some implementations, the work surface can be more than one surface, such as a vertical surface and a horizontal surface. Thus, air can be pulled downward and horizontally through the perforated holes into the downdraft table by a fan, which is located below the work surface. In other implementations, the work surface is one surface, for example, a horizontal surface. In other implementations, for example in an air filtration system, air can be pulled through an intake, panel, nozzle, or other entry way.

An operation 906 arrests sparks with a spark arrestor located in between the filter cartridge and the work surface in the main housing of the downdraft table. The spark arrestor arrests sparks as air is drawn through the downdraft table. The spark arrestor adds protection against applications that may create sparks or increased risk of a fire such as welding, grinding metal, or plasma cutting. Air moves through the spark arrestor downward in the downdraft table, and then moves in a direction toward the center of the downdraft table into a compartment which houses at least one vertically aligned filter cartridge. As air moves into the filter cartridge, particulates in the air attach to the filter cartridge.

In some implementations, the downdraft table can include a self-closing louvre. An operation 908 permits airflow from the work surface through the downdraft table via the self-closing louvre. The louvre allows dirty air to move through the downdraft table in only one direction, thus protecting the operator from potential particulate following a filter purge operation.

An operation 910 draws air through a hollow filter cartridge located in the main housing of the downdraft table with a fan assembly. As air moves into the filter cartridge, particulates in the air attach to the exterior of the filter cartridge.

An operation 912 exhausts filtered air out of the downdraft table. In some implementations, an exhaust port is located in the back of the downdraft table, and air exits out a back wall of the downdraft table. In other implementations, the exhaust port 222 may be vented out a different wall of the downdraft table 100 (e.g., a bottom wall).

Figure 10:
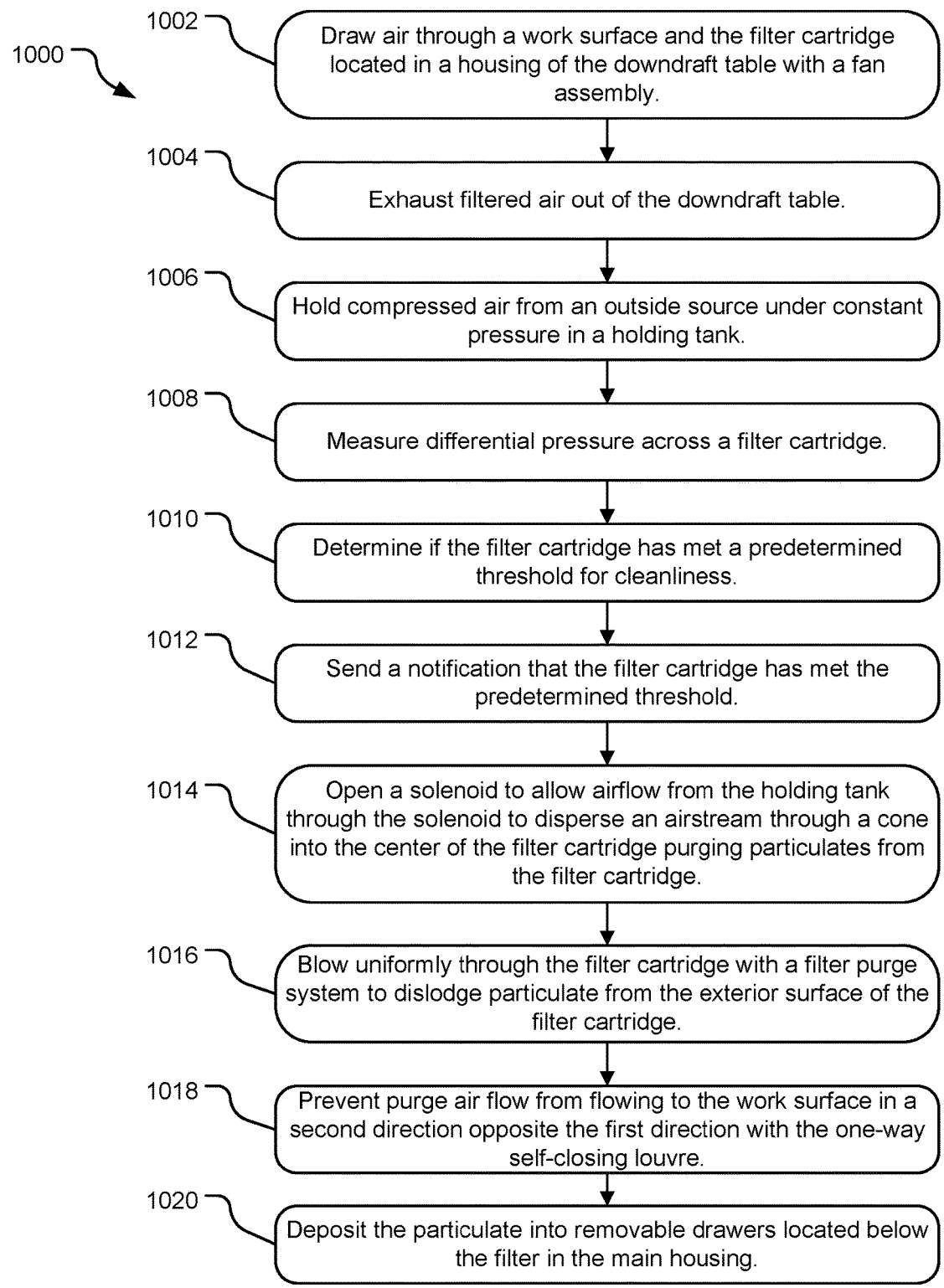
FIG. 10 illustrates a flowchart of example purge operations in an example downdraft table.

FIG. 10 illustrates a flowchart of example purge operations 1000 in an example downdraft table. Operations 1002 draw air through a work surface and the filter cartridge located in a housing of the downdraft table with a fan assembly. Specifically, air can be pulled through perforated holes in the work surface of the downdraft table.

Operations 1004 exhaust filtered air out of the downdraft table. In some implementations, an exhaust port is located in the back of the downdraft table, and air exits out a back wall of the downdraft table. In such implementations, the exhaust port, a connection for an air compressor source (not shown) and expanded metal on the back side of the downdraft table may be used for exhaust of air moving out of the downdraft table.

Operations 1006 hold compressed air from an outside source under pressure in a holding tank in the main housing. Operations 1008 measure the differential pressure in a filter cartridge. Operations 1010 determine the filter cartridge has met a predetermined differential pressure threshold for cleanliness. Operations 1012 send a notification that the filter cartridge has met the predetermined differential pressure threshold.

Operations 1014 open a solenoid in the main housing to allow airflow from the holding tank through the solenoid to disperse an airstream through a cone into the center of the filter cartridge purging particulates from the filter cartridge. Operations 1016 blow compressed air uniformly through the hollow filter cartridge with a filter purge system to dislodge particulate from the exterior surface of the filter cartridge.

Operations 1018 prevent purged air flow from flowing to the work surface in a second direction opposite the first direction with the one-way self-closing louvre. The louvre allows dirty air to move through the downdraft table in only one direction, thus protecting the operator from potential particulate following a filter purge operation. Operations 1020 deposit the particulate into removable drawers located below the filter in the main housing. Operations 1000 can be performed manually or automatically.

The logical operations making up the implementations described herein are referred to variously as operations, steps, objects, or modules. Furthermore, it should be understood that logical operations may be performed in any order, adding or omitting operations as desired, unless explicitly claimed otherwise or a specific order is inherently necessitated by the claim language.

It will be appreciated that the structure and/or functionality of the downdraft table may be different that that illustrated in FIGS. 1-10 and described herein. For example, the vertically aligned filter cartridges may be integrated within one common downdraft table, or used in combination with other systems for air filtration. Similarly, the arrangement of the components under the work surface are provided for purposes of illustration and not of limitation, and some components and/or interconnections may be omitted for purposes of clarity. It will be further appreciated that the downdraft table may not include all of the components shown in FIGS. 1-10, may include other components that are not explicitly shown in FIGS. 1-10, or may utilize an architecture completely different than that shown in FIGS. 1-10.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A downdraft table comprising:
   a vertically oriented cylindrical filter cartridge located below a work surface in a main housing of the downdraft table;
   a purge assembly in the main housing vertically aligned with the filter cartridge that discharges purged air to an interior of the filter cartridge to purge particulates collected on an exterior of the filter cartridge; and
   a self-closing louvre in the main housing that permits air flow from the work surface, through the louvre, and through the filter assembly in a first direction, and prevents purged air flow from flowing through the louvre to the work surface in a second direction opposite the first direction.

2. The downdraft table of claim 1, further comprising:
   a clamping assembly in the main housing that includes rails that slidably accept the filter cartridge and a locking mechanism that selectively presses the rails upwards against a filter cartridge seat to lock the filter cartridge in place within the downdraft table.

3. The downdraft table of claim 1, further comprising:
   a holding tank in the main housing configured to hold compressed air from an outside source under pressure.

4. The downdraft table of claim 3, further comprising:
   a solenoid in the main housing configured to open and allow airflow from the holding tank through the solenoid to disperse an airstream into an interior of the filter cartridge purging particulates from an exterior of the filter cartridge.

5. The downdraft table of claim 4, wherein the airstream is dispersed into the interior of the filter cartridge via a cartridge cleaning cone.

6. The downdraft table of claim 1, further comprising:
   removable drawers in the main housing for particulate collection.

7. The downdraft table of claim 1, further comprising:
   a spark arrestor in the main housing.

8. The downdraft table of claim 2, wherein the clamping assembly includes a cam lock mechanism.

9. The downdraft table of claim 1, wherein the downdraft table includes at least one of downdraft and backdraft airflow through the work surface.

10. A method comprising:
    providing vacuum in a downdraft table to provide even dispersion of airflow over a work surface of a downdraft table;
    drawing air through the work surface and a vertically oriented cylindrical filter cartridge located in a main housing of the downdraft table with a fan assembly;
    permitting airflow from the work surface through the downdraft table via a self-closing louvre; and
    exhausting filtered air out of the downdraft table.

11. The method of claim 10, further comprising:
    measuring differential pressure across the filter cartridge.

12. The method of claim 11, further comprising:
    determining that the filter cartridge has met a predetermined differential pressure threshold.

13. The method of claim 12, further comprising:
    sending a notification that the filter cartridge has met the predetermined differential pressure threshold.

14. The method of claim 10, further comprising:
    arresting sparks with a spark arrestor located between the filter cartridge and the work surface of the downdraft table.

15. The method of claim 10, further comprising:
    locking the filter cartridge with a clamping assembly in the main housing of the downdraft table that includes rails that slidably accept the filter cartridge and a locking mechanism that selectively presses the rails upwards against a filter cartridge seat to lock the filter cartridge in place.

16. A method comprising:
    drawing air through a work surface, a one-way self-closing louvre, and a vertically oriented cylindrical filter cartridge in a main housing of a downdraft table with a fan assembly in a first direction;
    exhausting filtered air out of the downdraft table;
    blowing compressed air uniformly through the filter cartridge with a filter purge system to dislodge particulate matter from a surface of the filter cartridge; and
    preventing purged airflow from flowing to the work surface in a second direction opposite the first direction with the one-way self-closing louvre.

17. The method of claim 16, further comprising:
    holding compressed air from an outside source under pressure in a holding tank; and
    opening a solenoid to allow air to flow from the holding tank through the solenoid to disperse an airstream through a cone into a center of the filter cartridge purging particulates from the filter cartridge.

18. The method of claim 16, further comprising:
    depositing the particulate matter into removable drawers located below the filter cartridge in the main housing.

19. The method of claim 16, wherein the blowing compressed air operation is performed manually.

20. The method of claim 16, wherein the blowing compressed air operation is performed automatically.

* * * * *